US011738776B2

(12) United States Patent
Gyllenhammar et al.

(10) Patent No.: US 11,738,776 B2
(45) Date of Patent: Aug. 29, 2023

(54) PERCEPTION PERFORMANCE EVALUATION OF A VEHICLE ADAS OR ADS

(71) Applicant: Zenuity AB, Gothenburg (SE)

(72) Inventors: Magnus Gyllenhammar, Pixbo (SE); Majid Khorsand Vakilzadeh, Mölndal (SE); Carl Zandén, Lindome (SE); Andreas Valencia Falkovén, Västra Frölunda (SE)

(73) Assignee: Zenuity AB, Gothenburg (SE)

( * ) Notice: Subject to any disclaimer, the term of this patent is extended or adjusted under 35 U.S.C. 154(b) by 232 days.

(21) Appl. No.: 17/154,202

(22) Filed: Jan. 21, 2021

(65) Prior Publication Data

US 2021/0221403 A1 Jul. 22, 2021

(30) Foreign Application Priority Data

Jan. 22, 2020 (EP) .................................. 20153214

(51) Int. Cl.
*B60W 60/00* (2020.01)
*B60W 50/035* (2012.01)
(Continued)

(52) U.S. Cl.
CPC ...... *B60W 60/0027* (2020.02); *B60W 50/035* (2013.01); *G05D 1/0061* (2013.01);
(Continued)

(58) Field of Classification Search
CPC .... G05D 1/0061; G05D 1/0276; G07C 5/008; G07C 5/0808; G07C 5/085;
(Continued)

(56) References Cited

U.S. PATENT DOCUMENTS

| 2018/0113472 A1* | 4/2018 | Sakr ..................... G05D 1/0276 |
| 2018/0186468 A1* | 7/2018 | Songa .................. G08B 21/182 |

(Continued)

FOREIGN PATENT DOCUMENTS

| CN | 106143361 A | * 11/2016 |
| CN | 104925001 B | * 12/2018 |

(Continued)

OTHER PUBLICATIONS

Schreier, Machine translation of DE-102016218934-A1 (Year: 2018).*
(Continued)

*Primary Examiner* — Anne Marie Antonucci
*Assistant Examiner* — Patrick Daniel Mohl
(74) *Attorney, Agent, or Firm* — Christopher & Weisberg, P.A.

(57) ABSTRACT

An apparatus and method performed by a perception comparing system of a vehicle for perception performance evaluation of an ADAS or ADS. The perception comparing system establishes communication with a secondary vehicle determined and/or estimated to be positioned within a potential range of surrounding detecting sensors on-board the vehicle. The system derives perception data from a perception system of the ADAS or ADS. The system receives secondary perception data from a secondary perception system of a secondary ADAS or ADS of the secondary vehicle and determines a discrepancy output based on comparison of at least a portion of the both of perception data and the secondary perception data. The system communicates acknowledgement data when at least a portion of the discrepancy output fulfils discrepancy exceedance criteria (Continued)

1 Perception comparing system and/or when the vehicle is perceivable in the secondary perception data but the secondary vehicle not is locatable in the perception data.

20 Claims, 6 Drawing Sheets

(51) Int. Cl.
  *G05D 1/00* (2006.01)
  *G05D 1/02* (2020.01)
  *G07C 5/00* (2006.01)
  *G07C 5/08* (2006.01)
(52) U.S. Cl.
  CPC .......... *G05D 1/0276* (2013.01); *G07C 5/008* (2013.01); *G07C 5/0808* (2013.01); *B60W 2554/4041* (2020.02); *B60W 2556/65* (2020.02)
(58) Field of Classification Search
  CPC ..... B60W 2554/4041; B60W 2556/65; B60W 2050/046; B60W 2556/20; B60W 2556/45; B60W 50/0098; B60W 50/00; H04W 4/38; H04W 4/40; H04W 4/029; G01S 7/497; G01S 13/931; G01S 7/40; G08G 1/163
  See application file for complete search history.

(56) References Cited

U.S. PATENT DOCUMENTS

| | | | | |
|---|---|---|---|---|
| 2019/0316913 | A1* | 10/2019 | Golov | G01C 21/30 |
| 2020/0019160 | A1* | 1/2020 | McArthur | G01S 17/87 |
| 2020/0124447 | A1* | 4/2020 | Schwindt | G01S 15/931 |

FOREIGN PATENT DOCUMENTS

| | | | |
|---|---|---|---|
| DE | 112015005917 | T5 * | 9/2017 |
| DE | 102016218934 | A1 * | 3/2018 |
| DE | 102016221440 | A1 | 5/2018 |
| DE | 102017207233 | A1 | 10/2018 |
| JP | 2006349405 | A * | 12/2006 |

OTHER PUBLICATIONS

Tezuka, Machine translation of CN-106143361-A (Year: 2016).*
Coelingh, Machine translation of CN-104925001-B (Year: 2018).*
Masayoshi, Machine translation of JP-2006349405-A (Year: 2006).*
Kumabe, Machine translation of DE-112015005917-T5 (Year: 2017).*
Extended European Search Report dated Jul. 31, 2020 issued in European Application No. 20153214.0, consisting of 9 pages.

* cited by examiner

PERCEPTION PERFORMANCE EVALUATION OF A VEHICLE ADAS OR ADS

CROSS-REFERENCE TO RELATED APPLICATION

This Application is related to and claims priority to European Patent Application No. 20153214.0, filed Jan. 22, 2020, the entirety of which is incorporated herein by reference.

TECHNICAL FIELD

The present disclosure relates to perception performance evaluation of an advanced driver-assistance system, ADAS, or automated driving system, ADS, of a vehicle.

BACKGROUND

An increasing number of modern vehicles have advanced driver-assistance systems, ADAS, to increase vehicle safety and more generally road safety. ADAS—which for instance may be represented by adaptive cruise control, ACC, collision avoidance system, forward collision warning, etc.—are electronic systems that may aid a vehicle driver while driving. To function as intended, ADAS may rely on inputs from multiple data sources, such as e.g. automotive imaging, LIDAR, radar, image processing, computer vision, and/or in-car networking.

Moreover, in a not too distant future, autonomous or automated driving systems, ADSs, will to greater extent find their way into modern vehicles. An ADS is a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all responsibilities to the system. An ADS commonly combines a variety of sensors to perceive the vehicle's surroundings, such as e.g. radar, LIDAR, sonar, camera, navigation system e.g. GPS, odometer and/or inertial measurement units, upon which advanced control systems may interpret sensory information to identify appropriate navigation paths, as well as obstacles and/or relevant signage.

Eventually, essentially fully autonomous vehicles capable of sensing their environment and moving safely along e.g., public roads with little or no human input, may see the light of day.

An ADAS or ADS as described above is, however, bound to be required to function with a high integrity to provide sufficiently low risk for the vehicle user(s) as well as other traffic participants. Ensuring that the risk is sufficiently low may require intractable amounts of data for statistical proofs, and would—according to an example—take e.g., approximately a hundred vehicles to drive continuously for five centuries, to acquire. There are several approaches to minimize the risk of the ADAS or ADS before it is launched onto public roads. However, on top of this, it is generally believed that the ADAS or ADS should be monitored once in the field, in order to ensure that it adheres to required safety levels. It is difficult though to conduct this monitoring of the performance of the ADAS or ADS relying solely on the ADAS's OR ADS's perception system output—i.e., view of the world—also used to achieve the dynamic driving task of the ADAS or ADS. That is, should said perception system systematically perform sub-optimally, this may be challenging to spot before occurrence of a near accident or even accident.

SUMMARY OF THE INVENTION

It is therefore an object of embodiments herein to provide an approach for in an improved and/or alternative manner evaluate perception performance of an ADAS or ADS of a vehicle, such as in the field.

The object above may be achieved by the subject-matter disclosed herein. Embodiments are set forth in the appended claims, in the following description and in the drawings.

The disclosed subject-matter relates to a method performed by a perception comparing system of a vehicle for perception performance evaluation of an advanced driver-assistance system, ADAS, or automated driving system, ADS, of the vehicle. The perception comparing system establishes communication with a secondary vehicle determined and/or estimated to be positioned within a potential range of surrounding detecting sensors on-board the vehicle. The perception comparing system further derives perception data from a perception system of the ADAS or ADS adapted to estimate surroundings of the vehicle. Moreover, the perception comparing system receives secondary perception data from a secondary perception system of a secondary ADAS or ADS of said secondary vehicle. The perception comparing system further determines, when the secondary vehicle is locatable in the perception data, a discrepancy output based on comparison of at least a portion of the perception data and at least a portion of the secondary perception data. Furthermore, the perception comparing system communicates acknowledgement data when at least a portion of the discrepancy output fulfils discrepancy exceedance criteria, and/or when the vehicle is perceivable in the secondary perception data but the secondary vehicle not is locatable in the perception data.

The disclosed subject-matter further relates to a perception comparing system of a vehicle for—and/or adapted for—perception performance evaluation of an ADAS or ADS of the vehicle. The perception comparing system comprises a communication establishing unit for—and/or adapted for—establishing communication with a secondary vehicle determined and/or estimated to be positioned within a potential range of surrounding detecting sensors on-board the vehicle. The perception comparing system further comprises a perception data deriving unit for—and/or adapted for—deriving perception data from a perception system of the ADAS or ADS adapted to estimate surroundings of the vehicle. Moreover, the perception comparing system comprises a secondary perception data receiving unit for—and/or adapted for—receiving secondary perception data from a secondary perception system of a secondary ADAS or ADS of the secondary vehicle. The perception comparing system further comprises a discrepancy output determining unit for—and/or adapted for—determining, when the secondary vehicle is locatable in the perception data, a discrepancy output based on comparison of at least a portion of the perception data and at least a portion of the secondary perception data. Furthermore, the perception comparing system comprises an acknowledgement communicating unit for—and/or adapted for—communicating acknowledgement data when at least a portion of the discrepancy output fulfils discrepancy exceedance criteria, and/or when the vehicle is perceivable in the secondary perception data but the secondary vehicle not is locatable in the perception data.

Furthermore, the disclosed subject-matter relates to a vehicle comprising an ADAS or ADS, and further comprising a perception comparing system as described herein.

Moreover, the disclosed subject-matter relates to a computer program product comprising a computer program containing computer program code means arranged to cause a computer or a processor to execute the steps of the perception comparing system described herein, stored on a computer-readable medium or a carrier wave.

The disclosed subject-matter further relates to a non-volatile computer readable storage medium having stored thereon said computer program product.

Thereby, there is introduced an approach according to which perception performance of a perception system of an ADAS or ADS may be assessed—such as in the field—to evaluate whether it is failing and/or in risk of failing, and take action when such is the case. That is, since communication is established with a secondary vehicle determined and/or estimated to be positioned within a potential range of surrounding detecting sensors on-board the ego-vehicle, said ego-vehicle may communicate with another vehicle deemed to be within a sensor and/or perception range or expected sensor and/or perception range thereof. Furthermore, that is, since perception data is derived from a perception system of the ADAS or ADS, adapted to estimate surroundings of the vehicle, a world view is provided for the ego-vehicle, presenting a perceived model of ego-vehicle surroundings. Moreover, that is, since secondary perception data is received from a secondary perception system of a secondary ADAS or ADS of the secondary vehicle, there is provided to the ego-vehicle perception data—such as a world view— produced by the secondary vehicle, comprising a perceived model of secondary vehicle surroundings. Accordingly, since the secondary vehicle is determined and/or estimated to be within a potential range of surrounding detecting sensors of the ego-vehicle, perception data from the secondary vehicle may potentially at least partly overlap, correspond to and/or cover a geographical region comprised in perception data from the ego-vehicle. Furthermore, that is, since there is determined—when the secondary vehicle is locatable in the perception data—a discrepancy output based on comparison of at least a portion of the perception data and at least a portion of the secondary perception data, data relating to overlapping and/or corresponding portions, geographical regions or areas, objects etc. of the secondary perception data and ego-vehicle perception data may be compared and subsequently differences there between be identified, such as discrepancies associated with e.g. estimates of object states, localizations, free space and/or drivable area. Accordingly, the discrepancy output may indicate a perception error, failure and/or a risk of failure for the ego-vehicle perception system, and/or potentially the perception system of the secondary vehicle. Moreover, that is, since acknowledgement data is communicated when at least a portion of the discrepancy output fulfils discrepancy exceedance criteria and/or when the vehicle is perceivable in the secondary perception data but the secondary vehicle not is locatable in the perception data, an acknowledgement indicative of discrepancy may be transmitted from the perception comparing system. Accordingly, the perception comparing system brings attention e.g., to when ego-vehicle perception data deviates from the secondary vehicle perception data to an extent or in a manner fulfilling one or more conditions defined by the discrepancy exceedance criteria. Thus, based on said discrepancy or discrepancies, failure and/or risk of failure of the perception system of the ego-vehicle—and/or potentially the perception system of the secondary vehicle—may be evaluated.

For that reason, an approach is provided for in an improved and/or alternative manner evaluate perception performance of an ADAS or ADS of a vehicle, such as in the field.

The technical features and corresponding advantages of the above mentioned method will be discussed in further detail in the following.

BRIEF DESCRIPTION OF THE DRAWINGS

The various aspects of the non-limiting embodiments, including particular features and advantages, will be readily understood from the following detailed description and the accompanying drawings, in which.

DETAILED DESCRIPTION

Figure 1:
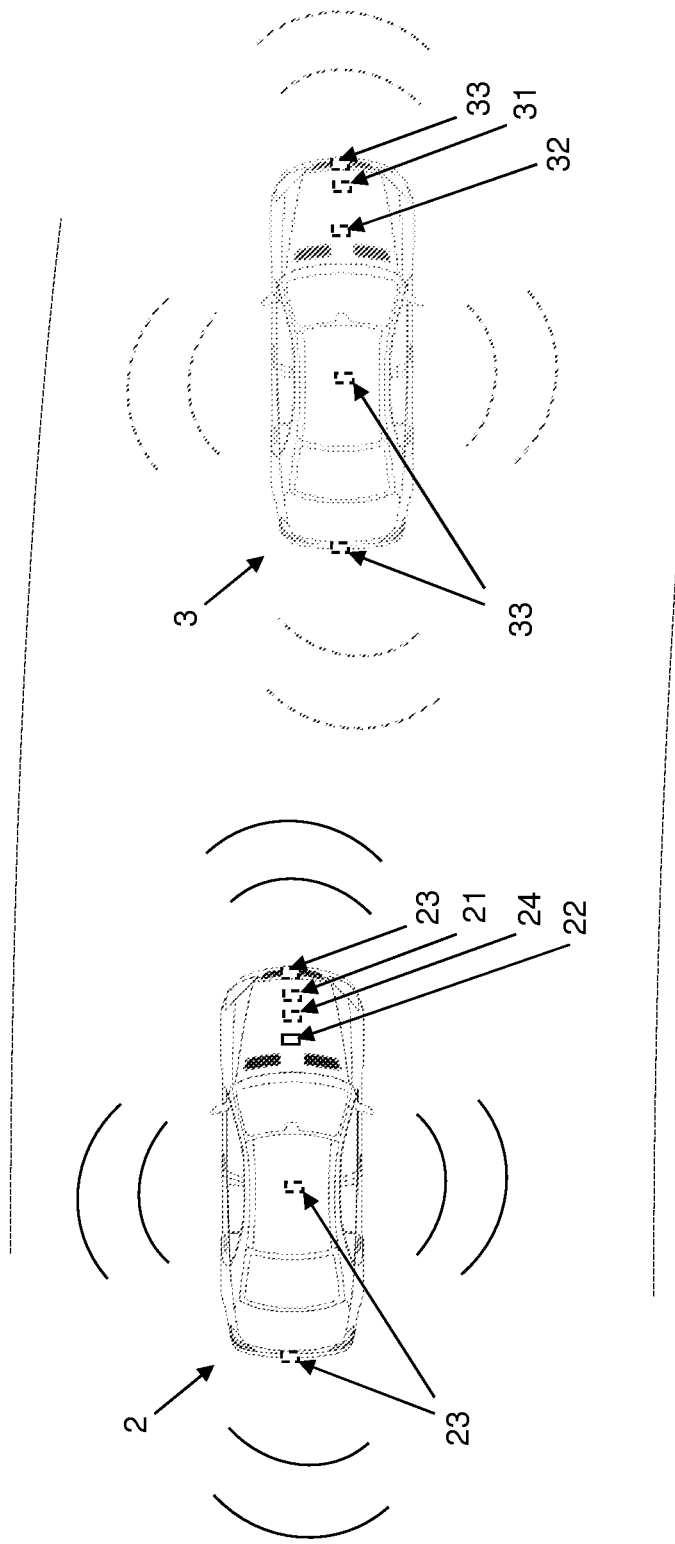
FIG. 1 illustrates a schematic view of an exemplifying perception comparing system of a vehicle according to embodiments of the disclosure.

Non-limiting embodiments of the present disclosure will now be described more fully hereinafter with reference to the accompanying drawings, in which currently preferred embodiments of the disclosure are shown. This disclosure may, however, be embodied in many different forms and should not be construed as limited to the embodiments set forth herein. Like reference characters refer to like elements throughout. Dashed lines of some boxes in the figures indicate that these units or actions are optional and not mandatory.

In the following, according to embodiments herein which relate to perception performance evaluation of an ADAS or ADS of a vehicle, there will be disclosed an approach according to which perception performance of a perception system of an ADAS or ADS may be assessed—such as in the field—to evaluate whether it is failing and/or in risk of failing, and take action when such is the case.

Referring now to the figures and FIG. 1 in particular, there is depicted a schematic view of an exemplifying perception comparing system 1 of a vehicle 2 according to embodiments of the disclosure. The exemplifying vehicle 2—which may be referred to as the ego-vehicle, host vehicle, primary vehicle and/or first vehicle—comprises, and/or is adapted to support, an ADAS and/or ADS 21, and here it further comprises the perception comparing system 1.

The exemplifying vehicle 2 may refer to any arbitrary manned or unmanned vehicle, for instance an engine-propelled or electrically-powered vehicle such as a car, truck, lorry, van, bus, motorcycle and/or tractor. Moreover, the term "vehicle" may refer to "launched vehicle", "road-traffic vehicle" and/or "production vehicle", and further to "autonomous and/or at least partly autonomous vehicle", "driverless and/or at least partly driverless vehicle", "automated and/or at least partly automated vehicle" and/or "self-driving and/or at least partly self-driving vehicle". The exemplifying ADAS or ADS may refer to any arbitrary ADAS or ADS e.g., known in the art and/or yet to be developed. The phrase "perception comparing system" may refer to "production vehicle perception comparing system", "perception failure evaluating system", "perception performance evaluating system", "perception performance validation system and/or "perception assessment system", whereas "of" a vehicle may refer to "comprised in" a vehicle and/or "on-board" a vehicle. "For" perception performance evaluation, on the other hand, may refer to "adapted for" perception performance evaluation, whereas the phrase "for perception performance evaluation" of an ADAS or ADS may refer to "for perception data performance evaluation" of an ADAS or ADS, "for perception performance monitoring and evaluation" of an ADAS or ADS, "for perception failure and/or failure-risk evaluation" of an ADAS or ADS, "for perception performance assessment" of an ADAS or ADS, "for perception performance validation" of an ADAS or ADS and/or "for perception evaluation" of an ADAS or ADS. According to an example, the phrase "for perception performance evaluation" of an ADAS or ADS may refer to "for perception performance evaluation, and potential further evaluation and/or intervention," of an ADAS or ADS. The phrase "perception performance evaluation of an ADAS or ADS of said vehicle" may refer to "perception performance evaluation associated with an ADAS or ADS of said vehicle", and/or "perception performance evaluation of perception estimates on which an ADAS or ADS of said vehicle is pertinent", whereas "an" ADAS or ADS may further refer to "at least a first" ADAS or ADS. According to an example, the phrase "perception performance evaluation" of an ADAS or ADS, may refer to "perception performance evaluation of a perception system" of an ADAS or ADS.

The vehicle 2 and/or the ADAS or ADS 21 may comprise, be provided with and/or have on-board a perception system 22 adapted to estimate surroundings of the vehicle 2, and subsequently adapted to estimate world views of the surroundings e.g., with support from a commonly known digital map such as a high definition, HD, map. The perception system 22 may refer to any commonly known system and/or functionality, e.g. comprised in one or more electronic control modules and/or nodes of the vehicle 2 and/or the ADAS or ADS 21, adapted and/or configured to interpret sensory information—relevant for driving of the vehicle 2—to identify e.g. obstacles, vehicle lanes, relevant signage, appropriate navigation paths etc. The exemplifying perception system 22—which may be adapted to support e.g., sensor fusion, tracking, localization etc.—may thus be adapted to rely on and obtain inputs from multiple data sources, such as automotive imaging, image processing, computer vision, and/or in-car networking, etc., in combination with sensory information. Such exemplifying sensory information may for instance be derived from one or more exemplifying surrounding detecting sensors 23 comprised in and/or provided on-board the vehicle 2. The surrounding detecting sensors 23 may be represented by any arbitrary sensors adapted to sense and/or perceive the vehicle's 2 surroundings and/or whereabouts, and may e.g., refer to one or a combination of one or more of radar, LIDAR, sonar, camera, navigation or positioning system e.g., GPS, odometer and/or inertial measurement units.

The perception comparing system 1 is—e.g., by means of a communication establishing unit 101 (shown in FIG. 4)—adapted and/or configured for establishing communication with a secondary vehicle 3 determined and/or estimated to be positioned within a potential range of surrounding detecting sensors 23 on-board the vehicle 2. Thereby, the ego-vehicle 2 may communicate with another vehicle 3 deemed to be within sensor and/or perception range—or expected sensor and/or perception range—of the ego-vehicle 2. The communication between the ego-vehicle 2 and the secondary vehicle 3—and establishment thereof—may be accomplished in any arbitrary manner—e.g., known—with support from e.g., communication systems (not shown) on-board respective vehicle 2, 3. The established communication may accordingly for instance involve exchanging security certificates between the ego-vehicle 2 and the secondary vehicle 3.

Whether to establish communication with the secondary vehicle 3 may be determined in an arbitrary manner deemed suitable and/or feasible, e.g., determined based on at least a first predeterminable trigger. Said optional trigger may for instance relate to determination and/or estimation of the secondary vehicle 3 being within a predeterminable distance and/or at a predeterminable angle from the ego-vehicle 2, such as e.g., estimated to be driving in vicinity of the ego-vehicle 2 along the same road. Additionally or alternatively, said trigger may for instance relate to the secondary vehicle 3 being determined to be of the same make as the ego-vehicle 2 and/or being equipped with a perception system, ADAS and/or ADS of the same brand, similar or identical to the optional perception system 22 and/or ADAS or ADS 21 of the ego-vehicle 2. Moreover, additionally or alternatively, said trigger may for instance relate to fulfillment of a timing criterion, such as e.g., time of day, day of week, time since previous trigger, new driving cycle etc. Further, additionally or alternatively, said trigger may for instance relate to a request from the perception comparing system—and/or e.g., a remote centralized system (such as the remote entity 9 shown in FIG. 4 and described in greater detail in conjunction therewith)—to establish communication with the secondary vehicle 3, for instance due to being deemed suitable and/or desirable.

Determining and/or estimating that the secondary vehicle 3 is positioned within a potential range of surrounding detecting sensors 23 of the ego-vehicle 2, may be accomplished in any arbitrary—e.g., known—manner. For instance, determining and/or estimating that the secondary vehicle 3 is positioned within a potential range of surrounding detecting sensors 23 of the ego-vehicle 2 may be accomplished by the ego-vehicle 2 itself with support from a digital map such as a HD map and/or said surrounding detecting sensors 23. Additionally or alternatively, this may be accomplished with support from vehicle-to-vehicle communication, and/or with support from the exemplifying remote centralized system discussed above which may be adapted for keeping track of real-time or essentially real-time positions of vehicles such as the ego-vehicle 2 and the secondary vehicle 3. The potential range of surrounding detecting sensors 23 may refer to any feasible range—e.g., pertinent characteristics and/or capacity of said sensors 23—or surrounding detecting sensors in general—and for instance refer to a distance such as exemplifying 10, 100 or 1000 meters from the ego-vehicle 2.

In exemplifying FIG. 1, the secondary vehicle 3 is in an exemplifying manner driving slightly ahead of the ego-vehicle 2, along the same road, in the same direction as said ego-vehicle 2. It may be noted, however, that the secondary vehicle 3 may be positioned arbitrarily in relation to the ego-vehicle 2, such as positioned behind, at another angle, driving in another e.g., opposite direction, etc. The exemplifying secondary vehicle 3 may similar to the ego-vehicle 2 refer to any arbitrary manned or unmanned vehicle, for instance an engine-propelled or electrically-powered vehicle such as a car, truck, lorry, van, bus, motorcycle and/or tractor. Moreover, the term "secondary vehicle" may similarly refer to "secondary launched vehicle", "secondary road-traffic vehicle" and/or "secondary production vehicle", and further to "secondary autonomous and/or at least partly autonomous vehicle", "secondary driverless and/or at least partly driverless vehicle", "secondary automated and/or at least partly automated vehicle" and/or "secondary self-driving and/or at least partly self-driving vehicle". The secondary vehicle 3 may furthermore have similar characteristics as the ego-vehicle 2 in terms of e.g., functionality, features, on-board systems and/or equipment, why detailed descriptions of such similar characteristics for the secondary vehicle 3 have been omitted. Accordingly, the secondary vehicle 3 may comprise, with functionalities similar to those of ego-vehicle 2, a corresponding secondary ADAS or ADS 31, a corresponding secondary perception system 32, corresponding secondary surrounding detecting sensors 33, and potentially furthermore a corresponding perception comparing system described herein.

The phrase "establishing communication with a secondary vehicle" may refer to "establishing communication with a nearby secondary vehicle", "establishing communication with a secondary vehicle involving exchanging security certificates and/or handshaking" and/or "establishing encrypted communication with a secondary vehicle", whereas the term "secondary" throughout may refer to "second", "reference" and/or "other". "A" secondary vehicle, on the other hand, may refer to "at least one" secondary vehicle. The phrase "determined and/or estimated to be positioned within a potential range of surrounding detecting sensors" may refer to "deemed and/or expected to be positioned within a potential range of surrounding detecting sensors", whereas "positioned" may refer to "located". According to an example, the phrase "determined and/or estimated to be positioned within a potential range" may refer to "determined and/or estimated—with support from a high definition, HD, map—to be positioned within a potential range" and/or "determined and/or estimated—with support from vehicle-to-vehicle communication and/or a remote centralized system knowledgeable of essentially real-time vehicle positions of said vehicle and said secondary vehicle—to be positioned within a potential range". "Potential range", on the other hand, may refer to "expected range" and/or "estimated range", whereas "range" may refer to "sensor and/or perception range". According to an example, the phrase "within a potential range of surrounding detecting sensors on-board said vehicle" may refer to "in vicinity of said vehicle", "within a predeterminable distance and/or at a predeterminable angle from said vehicle", "within a predeterminable distance from said vehicle shorter than a potential range of surrounding detecting sensors on-board said vehicle". Such an optional predeterminable distance may be of any arbitrary feasible extension deemed relevant for the situation at hand, and for instance refer to exemplifying 5, 50 or 500 meters from said vehicle 2. The phrase "surrounding detecting sensors", on the other hand, may refer to "one or more surrounding detecting sensors" and/or "surrounding detecting sensors adapted to capture surroundings of said vehicle", whereas "on-board said vehicle" may refer to "on-board the ego-vehicle".

Figure 2:
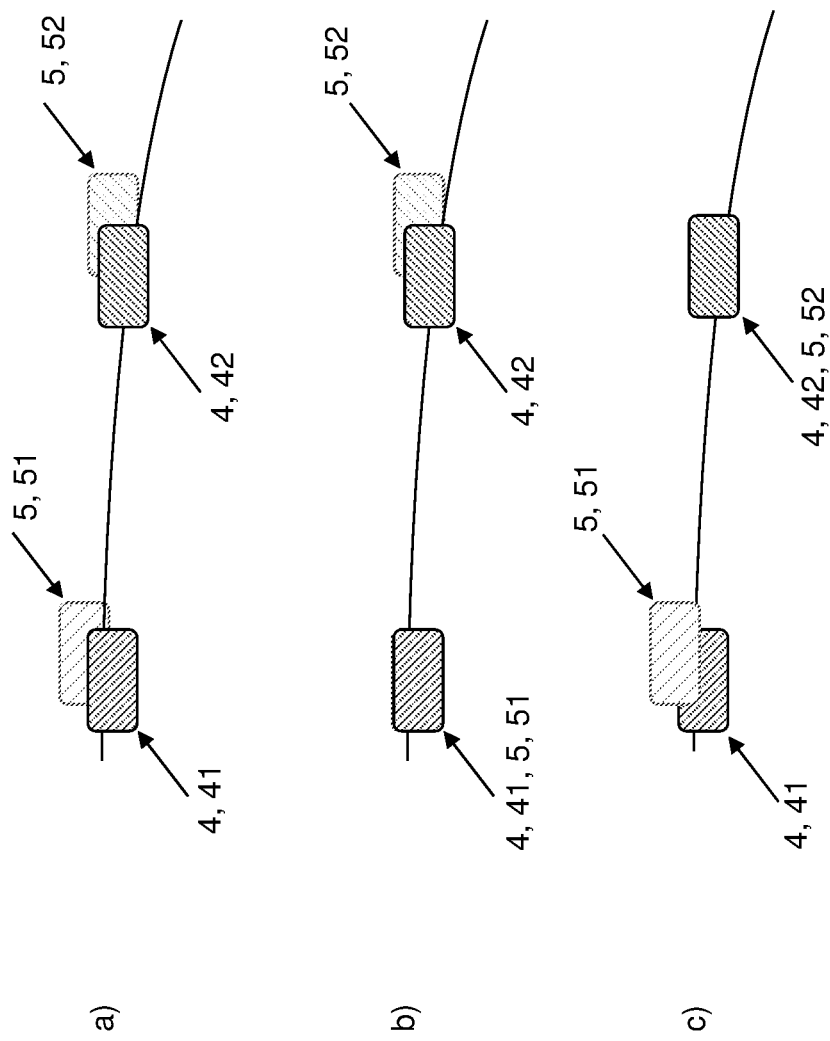
FIGS. 2a-c illustrate schematic views of varying exemplifying ego-vehicle perception data and corresponding secondary perception data along a high level view of a road according to embodiments of the disclosure.
Figure 3:
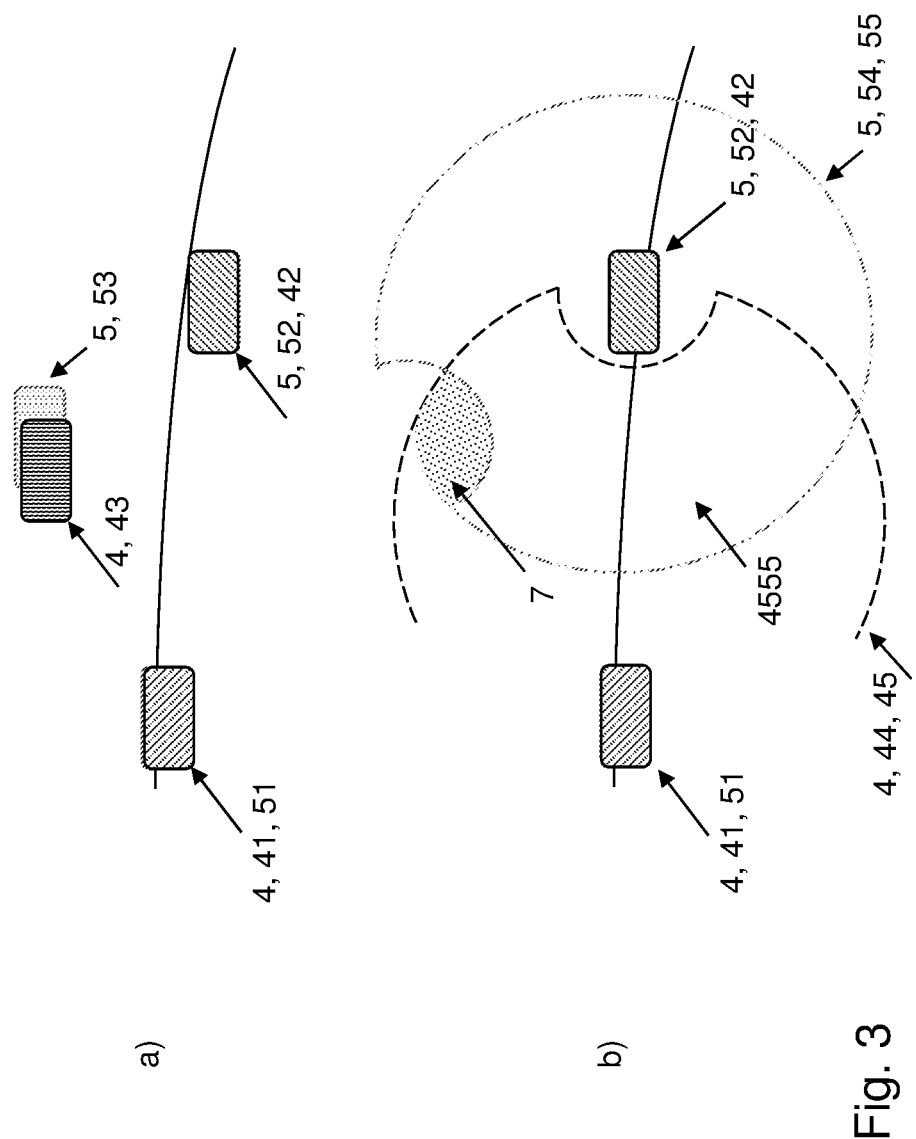
FIGS. 3a-c illustrate schematic views of varying alternative exemplifying ego-vehicle perception data and corresponding secondary perception data along a high level view of a road according to embodiments of the disclosure.
Figure 3:
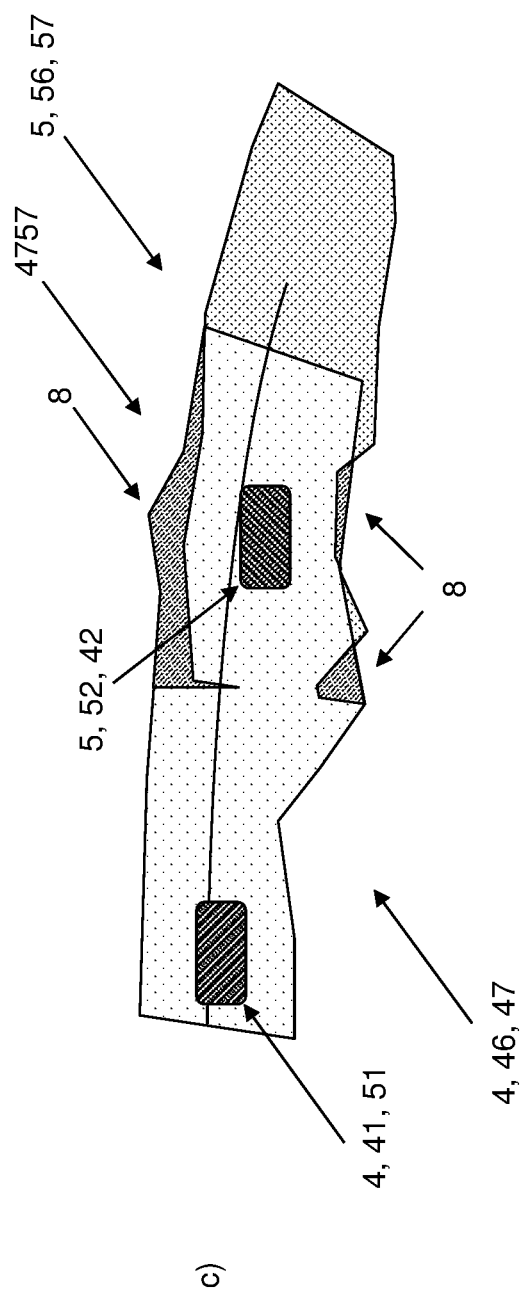

The perception comparing system 1 is—e.g., by means of a perception data deriving unit 102 (shown in FIG. 4)—adapted and/or configured for deriving perception data 4 (shown in FIGS. 2-3) from a perception system 22 of the ADAS or ADS 21, adapted to estimate surroundings of the vehicle 2. Thereby, a world view 4 is provided for the ego-vehicle 2, presenting a perceived model of ego-vehicle surroundings. Deriving perception data 4 may be accomplished in any arbitrary—e.g., known—manner, such as electronically and/or digitally. Moreover, the perception data 4 may refer to any arbitrary data of relevance for the ADAS or ADS 21, which data further may be indicative of perceptions of surroundings of the vehicle 2, e.g., comprising—and/or being derived from—sensory data from the one or more surroundings detecting sensors 23, internal ADAS or ADS 21 processing to achieve sensor fusion, tracking etc. and/or a digital map such as a HD map. It may be noted that according to an example, the perception data 4 may be derived from the perception system 22 even should the ego-vehicle 2 during said deriving and/or during production of the perception data 4 have been at least partly controlled by a vehicle driver.

The phrase "deriving perception data from a perception system" may refer to "retrieving and/or obtaining perception data from a perception system", and according to an example further to "determining perception data of a perception system". "Deriving perception data", on the other hand, may refer to "deriving primary and/or ego-vehicle perception data", "deriving world view data", "deriving a world view", "deriving a world view with support from internal processing of said ADAS or ADS and/or a digital map such as HD map" and/or "deriving a world view of global and/or HD map coordinates with support from a HD map". The phrase "from a perception system" may refer to "from a primary and/or ego-vehicle perception system". Moreover, "perception system adapted to estimate surroundings of said vehicle" may refer to "perception system adapted to estimate a world view for said vehicle" and/or "perception system adapted to estimate a world view of surroundings of said vehicle", and furthermore to "perception system adapted and/or configured to estimate at least a portion of surroundings of said vehicle", "perception system adapted and/or configured to interpret sensory information relevant for driving of said vehicle". "Surrounding of said vehicle", on the other hand, may refer to "surrounding of the ego, primary and/or host vehicle". According to an example, the phrase "perception system of said vehicle, adapted to estimate surroundings of said vehicle" may refer to "perception system of said vehicle, adapted to estimate surroundings of said vehicle with input from said surrounding detecting sensors and/or with support from a digital map such as a HD map". Furthermore, the term "perception" data may refer to "surroundings assessment" data and/or "sensory" data, whereas perception "data" may refer to perception "predictions", "information" and/or "estimates". "Perception" system, on the other hand, may refer to "vehicle surroundings assessment and/or evaluation" system, whereas perception "system" may refer to perception "function and/or functionality".

The perception comparing system 1 is—e.g., by means of a secondary perception data receiving unit 103 (shown in FIG. 4)—adapted and/or configured for receiving secondary perception data 5 (shown in FIGS. 2-3) from a secondary perception system 32 of a secondary ADAS or ADS 31 of the secondary vehicle 3. Thereby, there is provided to the ego-vehicle 2 perception data 5—such as a world view—produced by the secondary vehicle 3, comprising a perceived model of secondary vehicle surroundings. Accordingly, since the secondary vehicle 3 is determined and/or estimated to be within a potential range of surrounding detecting sensors 23 of the ego-vehicle 2, perception data 5 from the secondary vehicle 3 may potentially at least partly overlap, correspond to and/or cover a geographical region comprised in perception data 4 from the ego-vehicle 2. The secondary perception data 5—which may be indicative of perceptions of surroundings of the secondary vehicle 3 e.g., comprising and/or being derived from sensory data from the one or more secondary surrounding detecting sensors 33 and/or a secondary digital map such as a HD map—may be received from the secondary vehicle 3 in any arbitrary—e.g., known—manner, such as wirelessly, electronically and/or digitally. Said secondary perception data 5 may comprise data relevant for a geographical area at least partly overlapping a geographical area covered by the ego-vehicle perception data 4 i.e., the perception data 4 derived from the ego-vehicle 2. Moreover, the secondary perception system 32 may optionally be similar or identical to the perception system 22 of the ego-vehicle 2, such as having similar, corresponding and/or identical configurations, settings, output formats etc. Similarly, the secondary ADAS or ADS 31 may optionally be similar or identical to the perception system 22 of the ego-vehicle 2, such as referring to a similar, corresponding and/or identical ADAS or ADS, and/or having similar, corresponding and/or identical configurations, settings, etc. It may be noted that according to an example, the secondary perception data 5 may be received from the secondary vehicle 23 even should the secondary vehicle 3 during said receiving and/or during production of the secondary perception data 5 have been at least partly controlled by a vehicle driver.

The phrase "receiving secondary perception data" may refer to "obtaining and/or retrieving secondary perception data", whereas "secondary perception data" may refer to merely "perception data". In a similar manner, "secondary ADAS or ADS" may refer to merely "ADAS or ADS". According to an example, the phrase "receiving secondary perception data from a secondary perception system of a secondary ADAS or ADS of said secondary vehicle" may refer to "receiving secondary perception data from a secondary perception system of a secondary ADAS or ADS of said secondary vehicle, said secondary perception data comprising data relevant for a geographical area at least partly overlapping a geographical area covered by the perception data of said vehicle."

The perception comparing system 1 is—e.g., by means of a discrepancy output determining unit 104 (shown in FIG. 4)—adapted and/or configured for determining, when the secondary vehicle 3 is locatable in the perception data 4, a discrepancy output based on comparison of at least a portion of the perception data 4 and at least a portion of the secondary perception data 5. Thereby, provided the secondary vehicle 3 may be found in the perception data 4 of the ego-vehicle 2, data relating to overlapping and/or corresponding portions, geographical regions or areas, objects etc. of the secondary perception data 5 and ego-vehicle perception data 4 may be compared and subsequently differences there between be identified, such as discrepancies associated with e.g., estimates of object states, localizations, free space and/or drivable area. Accordingly, the discrepancy output may indicate a perception error, failure and/or a risk of failure for the ego-vehicle perception system 22, and/or potentially the perception system 32 of the secondary vehicle 3. Determining the discrepancy output may be accomplished by comparing data related to one or more selected e.g., overlapping portions and/or geographical areas of respective ego-vehicle perception data 4 and secondary perception data 5. Moreover, the at least a portion of the perception data 4 may refer to any arbitrary set of data of the ego-vehicle perception data 4 of any arbitrary size, e.g., a predeterminable set of data selected and/or deemed relevant for comparison. In a similar manner, the at least a portion of the secondary perception data 5 may refer to any arbitrary set of data of the secondary vehicle perception data 5 of any arbitrary size, e.g., a predeterminable set of data such as essentially corresponding to and/or overlapping the ego-vehicle perception data portion. The discrepancy output may refer to any arbitrary difference between the ego-vehicle perception data 4 and the perception data 5 from the secondary vehicle 3 which may be deemed relevant to evaluate, e.g., in view of quality aspects and/or safety critical aspects.

The phrase "determining a discrepancy output based on comparison of" may refer to "calculating a discrepancy output by comparing" and/or "determining—and subsequently storing—a discrepancy output based on comparison of", whereas "a discrepancy output" may refer to "a discrepancy output measure", "discrepancy data", "a perception discrepancy" and/or "a perception difference". "Comparison of at least a portion of said perception data and at least a portion of said secondary perception data", on the other hand, may refer to "by analyzing at least a portion of said perception data in view of at least a portion of said secondary perception data", "comparison of at least a portion of said perception data and at least a corresponding, relevant and/or essentially geographically overlapping portion of said secondary perception data" and/or "comparison of at least a portion of the ego-vehicle perception data and at least a portion of said secondary perception data". According to an example, the phrase "determining a discrepancy output based on comparison of at least a portion of said perception data and at least a portion of said secondary perception data", may refer to "determining a discrepancy output based on comparison of at least a portion of said perception data and at least a portion of said secondary perception data, said discrepancy output indicating a discrepancy between the perception data and the secondary perception data". Moreover, the phrase "when said secondary vehicle is locatable in said perception data" may refer to "provided that said secondary vehicle is locatable in said perception data" and/or "when said secondary vehicle is found, comprised in and/or perceivable in said perception data", and according to an example further to "when said secondary vehicle is identifiable in said perception data".

The perception comparing system 1 is—e.g., by means of an acknowledgement communicating unit 105 (shown in FIG. 4)—adapted and/or configured for communicating acknowledgement data 6 when at least a portion of the discrepancy output fulfils discrepancy exceedance criteria and/or when the vehicle 2 is perceivable in the secondary perception data 5 but the secondary vehicle 3 not is locatable in the perception data 4. Thereby, provided discrepancy criteria is fulfilled and/or provided that the ego-vehicle 2 is perceivable in the perception data 5 from the secondary vehicle 3 but the secondary vehicle 3 unexpectedly not is found in the ego-vehicle perception data 4, then an acknowledgement 6 indicative of discrepancy is transmitted from the perception comparing system 1. That is, the outcome of the comparison, i.e., the discrepancy output, may be considered in view of at least a first criterion, and should said criterion be fulfilled, then an acknowledgment 6 indicative thereof may be transmitted from the perception comparing system 1. In a similar manner, additionally or alternatively, should the secondary vehicle 3 unexpectedly not be comprised in the ego-vehicle perception data although the ego-vehicle 2 is perceivable in the perception data 5 from the secondary vehicle 3, then an acknowledgment 6 indicative thereof may be transmitted from the perception comparing system 1. Accordingly, the perception comparing system 1 brings attention to when ego-vehicle perception data 4 deviates from the secondary vehicle perception data 5 to an extent and/or in a manner fulfilling one or more conditions defined by the discrepancy exceedance criteria and/or when the ego-vehicle 2 is perceivable in the secondary perception data 5 but the secondary vehicle 3 unexpectedly not is locatable in the ego-vehicle perception data 4. Thus, failure and/or failure risk of the perception system 22 of the ego-vehicle 2, and/or potentially the perception system 32 of the secondary vehicle 3, may be evaluated. The discrepancy exceedance criteria may be defined by any one or more arbitrary criterion deemed relevant for the implementation at hand— e.g., in view of characteristics of and/or requirements related to the perception system 22 and/or the ADAS or ADS 21—such as e.g., a discrepancy maximum level, maximum number of exceedances of e.g., a discrepancy level, maximum number of exceedances of e.g., a discrepancy level within a predeterminable time frame, etc. Moreover, the discrepancy exceedance criteria may be variable, and furthermore predeterminable.

"Communicating" acknowledgement data may refer to "communicating wirelessly and/or by wire" acknowledgement data and/or "communicating in due time and/or when deemed feasible and/or safe" acknowledgement data, whereas "acknowledgement data" may refer to "one or more acknowledgement signals" and/or "an acknowledgement message", and further to "acknowledgement data indicative of, reflecting and/or comprising at least said discrepancy output and/or an indication of that the secondary vehicle not is locatable in said perception data". The term "when", on the other hand, may refer to "should" and/or "if". The phrase "at least a portion of said discrepancy output" may refer to "at least a predeterminable and/or selected portion of said discrepancy output", whereas the phrase "fulfils discrepancy exceedance criteria" may refer to "fulfils predeterminable discrepancy exceedance criteria", "fulfils at least a first exceedance criterion" and/or "exceeds one or more discrepancy exceedance thresholds". Moreover, the phrase "but said secondary vehicle not is locatable in said perception data" may refer to "but said secondary vehicle not is perceivable and/or comprised in said perception data", and according to an example, further to "but said secondary vehicle not is identifiable in said perception data" and/or "but said secondary vehicle not is locatable and perceivable in said perception data". Furthermore, the phrase "but said secondary vehicle not is locatable in said perception data" may further refer to "but said secondary vehicle unexpectedly not is locatable in said perception data". "Unexpectedly" not locatable may here indicate that the secondary vehicle 3—although expected and/or deemed to be so—is determined not to be locatable in the perception data 4. The secondary vehicle 3 may for instance be expected to be locatable if deemed possible to be located, such as e.g., based on deemed to be within sensor range and/or deemed not occluded or obstructed from view of one or more of the surrounding detecting sensors 23.

As further shown in FIGS. 2*a-c*, which illustrate schematic views of varying exemplifying ego-vehicle perception data 4 and corresponding secondary perception data 5 along a high level view of a road according to embodiments of the disclosure, the perception comparing system 1 may—e.g. by means of said discrepancy output determining unit 104— optionally be adapted and/or configured for determining at least a first portion of said discrepancy output based on comparison of perception data 4 comprising object state estimates 41 of the vehicle 2 and secondary perception data 5 comprising secondary object states estimates 51 of the vehicle 2. Additionally, or alternatively, the perception comparing system 1 may—e.g. by means of said discrepancy output determining unit 104—be adapted and/or configured for determining at least a first portion of the discrepancy output based on comparison of perception data 4 comprising object state estimates 42 of the secondary vehicle 3 and secondary perception data 5 comprising secondary object state estimates 52 of the secondary vehicle 3. Thereby, the discrepancy output may at least in part be based on the outcome of comparing object state estimates 41 such as localization of the ego-vehicle 2 from the ego-vehicle perception data 4 with object state estimates 51 such as localization of the ego-vehicle 2 comprised in the perception data 5 produced by—and subsequently received from—the secondary vehicle 3. Similarly, additionally or alternatively, thereby, the discrepancy output may at least in part be based on the outcome of comparing object state estimates 42 such as localization of the secondary vehicle 3 comprised in the ego-vehicle perception data 4 with object state estimates 52 such as localization of the secondary vehicle 3 from the perception data 5 produced by—and subsequently received from—the secondary vehicle 3. Accordingly, by comparison of internal beliefs 41 of the ego-vehicle perception system 22 of e.g. the localization of the ego-vehicle 2 with internal beliefs 51 of the secondary vehicle perception system 32 of the localization of the ego-vehicle 2, and/or by comparison of internal beliefs 42 of the ego-vehicle perception system 22 of e.g. the localization of the secondary vehicle 3 with internal beliefs 52 of the secondary vehicle perception system 32 of the localization of the secondary vehicle 3, a discrepancy there between may be identified and potentially evaluated.

In exemplifying FIG. 2*a*, there is a misalignment i.e., discrepancy between object state estimates 41 of the ego-vehicle 2 in the ego-vehicle perception data 4 as compared to object state estimates 51 of the ego-vehicle 2 in the secondary vehicle perception data 5. Similarly, there is a misalignment i.e., discrepancy between object state estimates 42 of the secondary vehicle 3 in the ego-vehicle perception data 4 as compared to object state estimates 52 of the secondary vehicle 3 in the secondary vehicle perception data 5. Should either or both of said discrepancies—i.e., discrepancy output—fulfil a discrepancy exceedance criterion, then acknowledgement data 6 may be communicated by the perception comparing system 1.

Comparably, in exemplifying FIG. 2*b*, there is no discrepancy between object state estimates 41 of the ego-vehicle 2 in the ego-vehicle perception data 4 as compared to object state estimates 51 of the ego-vehicle 2 in the secondary vehicle perception data 5, as said estimates 41, 51 align. Further comparably, in exemplifying FIG. 2*c*, there is no discrepancy between object state estimates 42 of the secondary vehicle 3 in the ego-vehicle perception data 4 as compared to object state estimates 52 of the secondary vehicle 3 in the secondary vehicle perception data 5, as said estimates 42, 52 align.

The object state estimates 41, 42, 51, 52 may e.g., comprise the ego- and/or the other vehicle's 2, 3 states, such as the ego- and/or the other vehicle's 2, 3 velocity, heading, acceleration, localization etc. The phrase "determining at least a first portion of said discrepancy output based on" may refer to "determining said discrepancy output at least partly based on". According to an example, the phrase "comparison of perception data comprising object state estimates of said vehicle and secondary perception data comprising secondary object state estimates of said vehicle" may refer to "applying a comparison function on a vector of said perception data comprising object state estimates of said vehicle and a secondary vector of said secondary perception data comprising secondary object states estimates of said vehicle". Similarly, according to an example, the phrase "comparison of perception data comprising object state estimates of said secondary vehicle and secondary perception data comprising secondary object state estimates of said secondary vehicle" may refer to "applying a comparison function on a vector of said perception data comprising object state estimates of said secondary vehicle and a secondary vector of said secondary perception data comprising secondary object state estimates of said secondary vehicle".

According to an example, one or more or at least a portion of the object state estimates 41, 42, 51, 52 may be expressed as state vectors, including localization, in an exemplifying manner denoted as $\vec{x}$. Should the ego-vehicle 2 be denoted with a subscript of e.g., e and the secondary vehicle 3 e.g., with the subscript 1, performance checks—i.e., determining one or more potential discrepancy outputs—may be formulated as follows:

$$f(\vec{x}_e, \vec{x}_e') < \in_e \quad \quad 1.$$

$$f(\vec{x}_1, \vec{x}_1') < \in_1 \quad \quad 2.$$

where the ' may correspond to the data 5, 51, 52 from the secondary vehicle 3. Each of the two exemplifying comparisons may be analysed using an arbitrary comparison function, $f$, e.g., absolute difference and/or mean square error, and this output—i.e., at least a portion of a discrepancy output—can be compared to at least a portion of discrepancy exceedance criteria, here denoted $\in$.

As further shown in FIGS. 3a-c, which illustrate schematic views of exemplifying ego-vehicle perception data 4 and corresponding secondary perception data 5 along a high level view of a road according to embodiments of the disclosure, the perception comparing system 1 may—e.g. by means of said discrepancy output determining unit 104—when localization estimates 41, 42 of the vehicle 2 and the secondary vehicle 3 in the perception data 4 respectively aligns with localization estimates 51, 52 of the vehicle 2 and said secondary vehicle 3 respectively in the secondary perception data 5, optionally be adapted and/or configured for determining additionally at least a second portion of the discrepancy output.

Said at least second portion of the discrepancy output may, as shown in exemplifying FIG. 3a, optionally be based on comparison of perception data 4 comprising object state estimates 43 of at least a first surrounding object and secondary perception data 5 comprising secondary object states estimates 53 of said at least first surrounding object. Thereby, provided that the localization estimates 41, 42 of the vehicle 2 and the secondary vehicle 3 in the perception data 4 respectively aligns with localization estimates 51, 52 of the vehicle 2 and said secondary vehicle 3 respectively in the secondary perception data 5, the discrepancy output may at least in part be based on the outcome of comparing object state estimates 43 such as localization of at least a first surrounding object from the ego-vehicle perception data 4 with object state estimates 53 such as localization of said at least first surrounding object comprised in the perception data 5 produced by—and subsequently received from—the secondary vehicle 3. Accordingly, by comparison of internal beliefs 43 of the ego-vehicle perception system 22 of the localization of the at least first surrounding object with internal beliefs 53 of the secondary vehicle perception system 32 of the localization of said at least first surrounding object, a discrepancy there between may be identified and potentially evaluated.

In exemplifying FIG. 3a, there is a misalignment i.e., discrepancy between object state estimates 43 of the at least first surrounding object in the ego-vehicle perception data 4 as compared to object state estimates 53 of said at least first surrounding object in the secondary vehicle perception data 5. Should said discrepancy—i.e., discrepancy output—fulfil a discrepancy exceedance criterion, then acknowledgement data 6 may be communicated by the perception comparing system 1. The at least first surrounding object may refer to any arbitrary moving or static object—e.g., a vehicle—deemed feasible and/or suitable for object state estimations 43, 53, and be of any arbitrary dimensions. Said at least first object may furthermore be arbitrarily positioned in view of the ego-vehicle 2 and the secondary vehicle 3, respectively.

Additionally or alternatively, said at least second portion of the discrepancy output may, as shown in exemplifying FIG. 3b, optionally be based on comparison of perception data 4 comprising free space estimates 44 of at least a region 45 around the vehicle 2 and secondary perception data 5 comprising secondary free space estimates 54 of at least a secondary region 55 around the secondary vehicle 3, which region 45 at least partly overlaps the secondary region 55. Thereby, provided that the localization estimates 41, 42 of the vehicle 2 and the secondary vehicle 3 in the perception data 4 respectively aligns with localization estimates 51, 52 of the vehicle 2 and said secondary vehicle 3 respectively in the secondary perception data 5, the discrepancy output may at least in part be based on the outcome of comparing free space estimates 44 comprised in the ego-vehicle perception data 4 and free space estimates 54 comprised in the perception data 5 produced by—and subsequently received from—the secondary vehicle 3, of an overlapping region 4555. Accordingly, by comparison of internal beliefs 44 of the ego-vehicle perception system 22 of free space—such as the area where no other objects are deemed to be positioned—with internal beliefs 54 of the secondary vehicle perception system 32 of free space in an overlapping region 4555, a discrepancy there between may be identified and potentially evaluated.

In exemplifying FIG. 3b, there is a misalignment i.e., discrepancy 7 between free space estimates 44 in the ego-vehicle perception data 4 as compared to free space estimates 54 in the secondary vehicle perception data 5. Should said discrepancy 7—i.e., discrepancy output—fulfil a discrepancy exceedance criterion, then acknowledgement data 6 may be communicated by the perception comparing system 1. The free space region 45 may refer to any to arbitrarily dimensioned region around the ego-vehicle 2, in any arbitrary direction of said ego-vehicle 2. Similarly, the secondary free space region 55 may refer to any to arbitrarily dimensioned region around the secondary vehicle 3, in any arbitrary direction of said secondary vehicle 3, provided that the secondary region 55 overlaps 4555 the ego-vehicle region 45 to an arbitrarily sized and/or dimensioned extent.

Additionally or alternatively, said at least second portion of the discrepancy output may, as shown in exemplifying FIG. 3c, optionally be based on comparison of perception data 4 comprising drivable area estimates 46 in at least a region 47 around the vehicle 2 and secondary perception data 5 comprising secondary drivable area estimates 56 in at least a secondary region 57 around the secondary vehicle 3, which region 47 at least partly overlaps the secondary region 57. Thereby, provided that the localization estimates 41, 42 of the vehicle 2 and the secondary vehicle 3 in the perception data 4 respectively aligns with localization estimates 51, 52 of the vehicle 2 and said secondary vehicle 3 respectively in the secondary perception data 5, the discrepancy output may at least in part be based on the outcome of comparing drivable area estimates 46 comprised in the ego-vehicle perception data 4 and drivable area estimates 56 comprised in the perception data 5 produced by—and subsequently received from—the secondary vehicle 3, of an overlapping region 4757. Accordingly, by comparison of internal beliefs 46 of the ego-vehicle perception system 22 of drivable area—such as the area deemed to be a drivable road—with internal beliefs 56 of the secondary vehicle perception system 32 of drivable area in an overlapping region 4757, a discrepancy there between may be identified and potentially evaluated.

In exemplifying FIG. 3c, there is a misalignment i.e., discrepancy 8 between drivable area estimates 46 in the ego-vehicle perception data 4 as compared to drivable area estimates 56 in the secondary vehicle perception data 5. Should said discrepancy 8—i.e., discrepancy output—fulfil a discrepancy exceedance criterion, then acknowledgement data 6 may be communicated by the perception comparing system 1. The drivable area region 46 may refer to any to arbitrarily dimensioned region around the ego-vehicle 2, in an essentially forward direction of said ego-vehicle 2. Similarly, the secondary drivable area region 55 may refer to any to arbitrarily dimensioned region around the secondary vehicle 3, in an essentially forward direction of said secondary vehicle 3, provided that the secondary region 55 overlaps 4555 the ego-vehicle region 45 to an arbitrarily sized and/or dimensioned extent.

The phrase "when localization estimates of said vehicle and said secondary vehicle in said perception data respectively aligns with localization estimates of said vehicle and said secondary vehicle respectively in said secondary perception data" may refer to "when said first portion of the discrepancy output indicates that localization estimates of said vehicle and said secondary vehicle in said perception data respectively aligns with localization estimates of said vehicle and said secondary vehicle respectively in said secondary perception data", whereas "respectively aligns" may refer to "respectively essentially aligns". "Aligns", on the other hand, may refer to "coincides". "Object state estimates of at least a first surrounding object", on the other hand, may refer to "object state estimates including localization of at least a first surrounding object". According to an example, the phrase "when localization estimates of said vehicle and said secondary vehicle in said perception data respectively aligns with localization estimates of said vehicle and said secondary vehicle respectively in said secondary perception data" may refer to "when localization estimates of said vehicle and said secondary vehicle in said perception data vector respectively aligns with localization estimates of said vehicle and said secondary vehicle respectively in said secondary perception data vector". According to a further example, the phrase "comparison of perception data" may in this context refer to "applying a comparison function on a vector of said perception data", whereas "secondary perception data" in this context may refer to "a secondary vector of said secondary perception data".

The perception comparing system 1 may—e.g., by means of the acknowledgement communicating unit 105 (shown in FIG. 4)—optionally be adapted and/or configured for transmitting the acknowledgement data 6 wirelessly to a remote entity 9. Said acknowledgement data 6 may for instance comprise the discrepancy output. Thereby, data related to e.g., the discrepancy output may be transmitted to the entity 9 for offline processing and/or analysis. Additionally or alternatively, the acknowledgement data 6 may comprise an indication of that the ego-vehicle 2 is perceivable in the secondary perception data 5 but the secondary vehicle 3 not is locatable in the ego-vehicle perception data 4. The timing of transmittal may be arbitrarily selected as deemed feasible, such as e.g., promptly or at a point in time deemed suitable. The latter case may e.g., refer to awaiting a high bandwidth connection to the remote entity 9, such as e.g., a Wifi connection.

The entity 9 may refer to any off-board data storage entity—e.g., known—adapted for and/or configured for off-board and/or offline processing and/or analysis, such as e.g., a cloud and/or automotive cloud, cloud network adapted for cloud-based storage, back-end system, and/or one or more servers. "Remote" entity may refer to "off-board" entity and/or "offline" entity, whereas "comprising said discrepancy output" may refer to "comprising essentially said discrepancy output".

Additionally or alternatively, optionally, the perception comparing system 1 may—e.g., by means of the acknowledgement communicating unit 105 (shown in FIG. 4)—be adapted and/or configured for transmitting the acknowledgement data 6 to an on-board ADAS/ADS control system 24 adapted to at least to some extent control the ADAS or ADS 21, which acknowledgement data 6 comprises an indication to at least partly disable the ADAS or ADS 21. Thereby, the ADAS or ADS 21 may be revoked to, at least temporarily, inhibit further activation(s).

The ADAS/ADS control system 24 may refer to any commonly known system and/or functionality, e.g., comprised in one or more electronic control modules and/or nodes of the ego-vehicle 2, adapted and/or configured to at least in part control the ADAS or ADS 21. "ADAS/ADS control system" may refer to "disablement system" and/or "ADAS or ADS control system", whereas ADAS/ADS control system adapted to "control" may refer to ADAS/ADS control system adapted to "at least partly control". "Comprising an indication" to at least partly disable, on the other hand, may refer to "prompting" to at least partly disable and/or "comprising instructions prompting" to at least partly disable, whereas "indication to at least partly disable" may refer to "indication to in due time at least partly disable" and/or "indication to at least partly disable when deemed feasible and/or safe". Moreover, "disable" the ADAS or ADS may refer to "inhibit" and/or "restrict functionality of" the ADAS or ADS.

Moreover, the perception comparing system 1 may further—e.g., by means of the acknowledgement communicating unit 105 (shown in FIG. 4)—optionally be adapted and/or configured for communicating, when the discrepancy output fulfils further discrepancy exceedance criteria, further acknowledgement data 60, which discrepancy exceedance criteria deviate from the further discrepancy exceedance criteria. Thereby, different acknowledgment data 6, 60 may be communicated depending on which discrepancy exceedance criteria is fulfilled. Accordingly, fulfilling discrepancy exceedance criteria—upon which the acknowledgement data 6 is communicated—may initiate a first action, whereas fulfilling further discrepancy exceedance criteria—upon which the further acknowledgement data 60 is communicated—may initiate a differing second action. That is, the outcome of the comparison and/or evaluation— i.e., the discrepancy output—is considered in view of additional second discrepancy exceedance criteria, and should said second discrepancy exceedance criteria be fulfilled, then a further acknowledgment 60 indicative thereof is transmitted from the perception comparing system 1. Accordingly, the perception comparing system 1 may additionally bring attention to when ego-vehicle perception data 4 deviates from secondary vehicle perception data 5 to an extent fulfilling the condition(s) defined by the further discrepancy exceedance criteria, which for instance may reflect greater and/or more frequent discrepancies. Thereby, there may be achieved a further evaluation in view of failure-risk, failure and/or failure rate—and/or intervention—of the ADAS or ADS. The further discrepancy exceedance criteria may be defined by any one or more arbitrary criterion deemed relevant for the implementation at hand—e.g., in view of characteristics of and/or requirements related to the perception system 22 and/or the ADAS or ADS 21—such as e.g., a discrepancy maximum level, maximum number of exceedances of e.g., a discrepancy level, maximum number of exceedances of e.g., a discrepancy level within a predeterminable time frame, etc. Moreover, the further discrepancy exceedance criteria may be variable, and furthermore predeterminable.

"Communicating" further acknowledgement data may refer to "communicating wirelessly and/or by wire" further acknowledgement data and/or "communicating in due time and/or when deemed feasible and/or safe" further acknowledgement data, whereas "further acknowledgement data" may refer to "at least second acknowledgement data", "one or more further acknowledgement signals" and/or "a further acknowledgement message". Moreover, "further acknowledgement data" may refer to "further acknowledgement data indicative of, reflecting and/or comprising at least said discrepancy output and/or an indication of that said vehicle is perceivable in said secondary perception data but said secondary vehicle not is locatable in said perception data". The phrase "when said discrepancy output fulfils further discrepancy exceedance criteria", on the other hand, may refer to "should said discrepancy output fulfil further discrepancy exceedance criteria" and/or "if said discrepancy output fulfils further discrepancy exceedance criteria". Moreover, "further discrepancy exceedance criteria" may refer to "predeterminable and/or predetermined further discrepancy exceedance criteria", and further to "second and/or at least second discrepancy exceedance criteria". The phrase "said discrepancy exceedance criteria deviating from said further discrepancy exceedance criteria", on the other hand, may refer to "said discrepancy exceedance criteria at least in part and/or to some extent deviating from said further discrepancy exceedance criteria".

The perception comparing system 1 may—e.g., by means of the acknowledgement communicating unit 105 (shown in FIG. 4)—optionally be adapted and/or configured for transmitting the further acknowledgement data 60 wirelessly to the remote entity 9. The further acknowledgement data 60 may for instance comprise the discrepancy output. Thereby, data related to e.g., the discrepancy output may be transmitted to the entity 9 for offline processing and/or analysis, when further discrepancy exceedance criteria is/are fulfilled. Additionally or alternatively, the further acknowledgement data 60 may comprise an indication of that the ego-vehicle 2 is perceivable in the secondary perception data 5 but the secondary vehicle 3 not is locatable in the ego-vehicle perception data 4. The timing of transmittal may be arbitrarily selected as deemed feasible, such as e.g., promptly or at a point in time deemed suitable. The latter case may e.g., refer to awaiting a high bandwidth connection to the remote entity 9, such as e.g., a Wifi connection.

Alternatively, optionally, the perception comparing system 1 may—e.g., by means of the acknowledgement communicating unit 105—optionally be adapted and/or configured for transmitting the further acknowledgement data 60 to the ADAS/ADS control system 24, which further acknowledgement data 60 comprises an indication to at least partly disable the ADAS or ADS 21. Thereby, the ADAS or ADS 21 may at least to some extent be revoked to, at least temporarily, inhibit further activation(s), when further discrepancy exceedance criteria is/are fulfilled.

Figure 4:
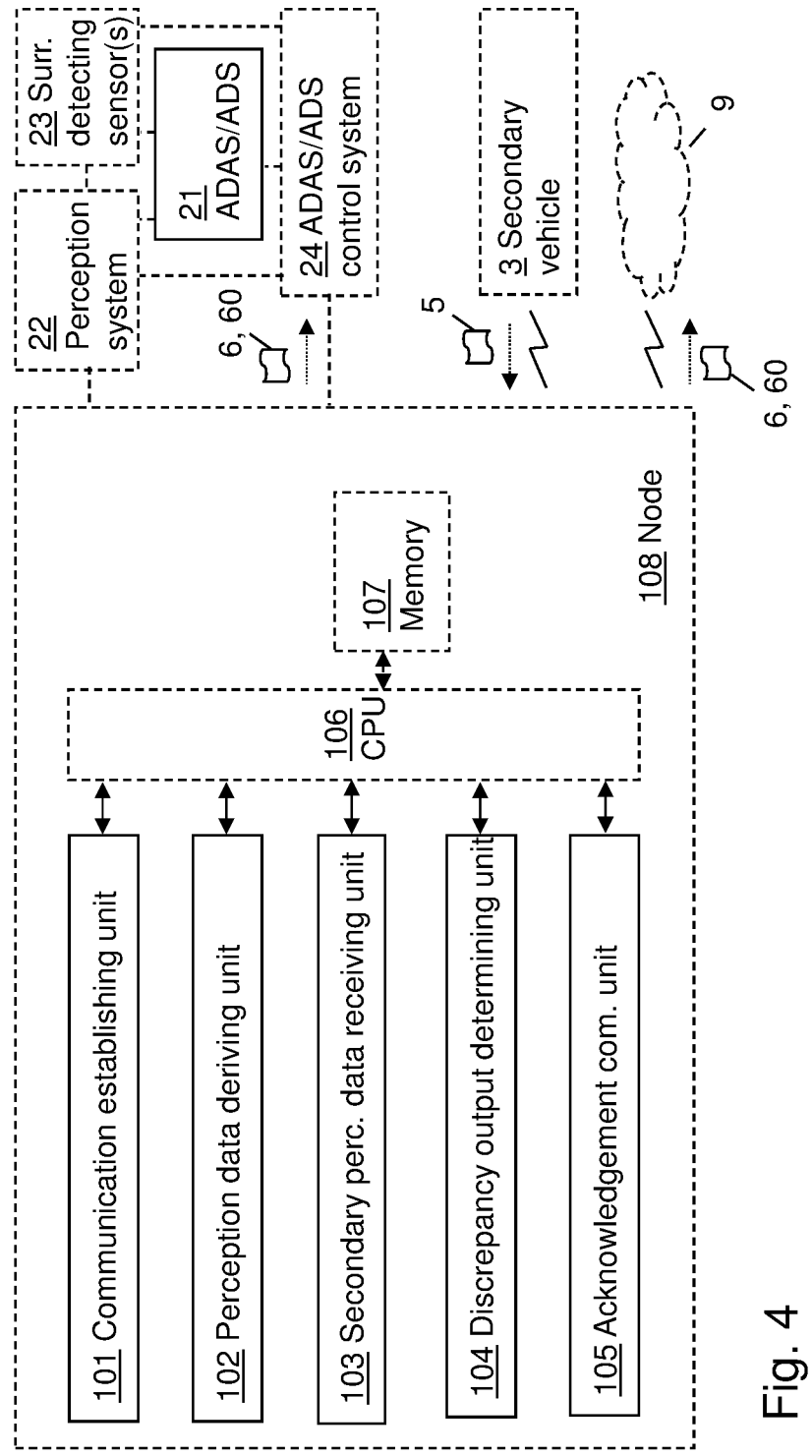
FIG. 4 is a schematic block diagram illustrating an exemplifying perception comparing system according to embodiments of the disclosure.

As further shown in FIG. 4, which is a schematic block diagram illustrating an exemplifying perception comparing system 1 according to embodiments of the disclosure, the perception comparing system 1 comprises a communication establishing unit 101, a perception data deriving unit 102, a secondary perception data receiving unit 103, a discrepancy output determining unit 104 and an acknowledgement communicating unit 105, all of which already have been described in greater detail above. Furthermore, the embodiments herein for perception performance evaluation of an ADAS or ADS 21 of a vehicle 2, may be implemented through one or more processors, such as a processor 106, here denoted CPU, together with computer program code for performing the functions and actions of the embodiments herein. Said program code may also be provided as a computer program product, for instance in the form of a data carrier carrying computer program code for performing the embodiments herein when being loaded into the perception comparing system 1. One such carrier may be in the form of a CD ROM disc and/or a hard drive, it is however feasible with other data carriers. The computer program code may furthermore be provided as pure program code on a server and downloaded to the perception comparing system 1. The perception comparing system 1 may further comprise a memory 107 comprising one or more memory units. The memory 107 may be arranged to be used to store e.g., information, and further to store data, configurations, scheduling, and applications, to perform the methods herein when being executed in the perception comparing system 1. For instance, the computer program code may be implemented in the firmware, stored in FLASH memory 107, of an embedded processor 106, and/or downloaded wirelessly e.g., from an off-board server. Furthermore, the communication establishing unit 101, the perception data deriving unit 102, the secondary perception data receiving unit 103, the discrepancy output determining unit 104, the acknowledgement communicating unit 105, the optional processor 106 and/or the optional memory 107, may at least partly be comprised in one or more nodes 108 e.g., ECUs of the vehicle 2. Those skilled in the art will also appreciate that said units 101, 102, 103, 104, 105 described above may refer to a combination of analog and digital circuits, and/or one or more processors configured with software and/or firmware, e.g., stored in a memory such as the memory 107, that when executed by the one or more processors such as the processor 106 perform as described herein, such as in conjunction with FIG. 5. One or more of these processors, as well as the other digital hardware, may be included in a single Application-Specific Integrated Circuitry, ASIC, or several processors and various digital hardware may be distributed among several separate components, whether individually packaged or assembled into a System-on-a-Chip, SoC.

Further shown in FIG. 4 is the ADAS or ADS 21, the perception system 22, the optional one or more surrounding detecting sensors 23, the optional ADAS/ADS control system 24, the secondary vehicle 3, the secondary perception data 5, the acknowledgement data 6, the optional further acknowledgement data 60, and the optional remote entity 9, all of which have been discussed in greater detail above.

Figure 5:
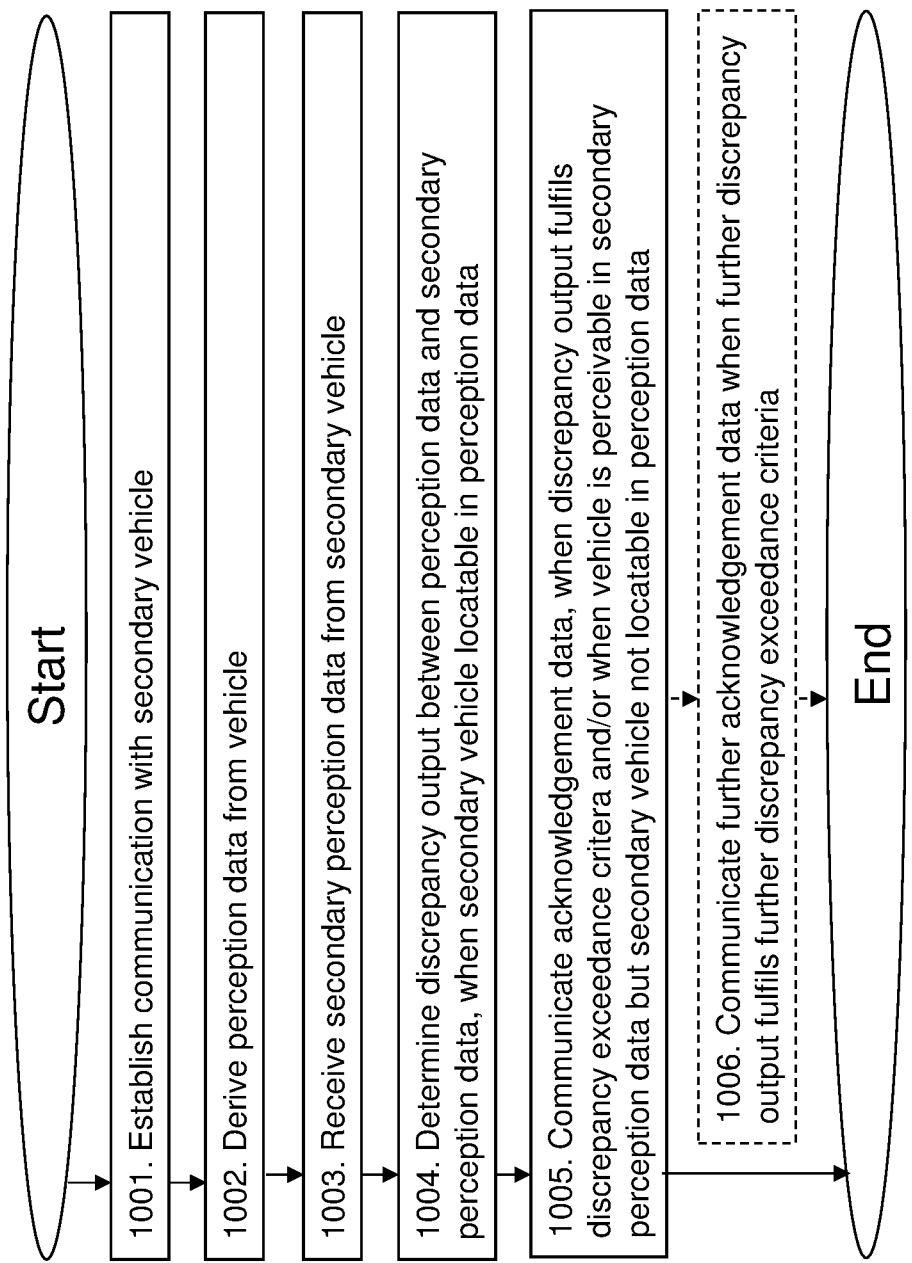
FIG. 5 is a flowchart depicting an exemplifying method performed by a perception comparing system according to embodiments of the disclosure.

FIG. 5 is a flowchart depicting an exemplifying method performed by a perception comparing system 1 according to embodiments of the disclosure. Said method is for perception performance evaluation of an ADAS or ADS 21 of a vehicle 2. The exemplifying method, which may be continuously repeated, comprises one or more of the following actions discussed with support from FIGS. 1-4. Moreover, the actions may be taken in any suitable order and/or one or more actions may be performed simultaneously and/or in alternate order where applicable. For instance, Action 1002 and Action 1003 may be performed in alternate order and/or simultaneously.

Action 1001

In Action 1001, the performance comparing system 1 establishes—e.g., with support from the communication establishing unit 101—communication with a secondary vehicle 3 determined and/or estimated to be positioned within a potential range of surrounding detecting sensors 23 on-board the vehicle 2.

Action 1002

In Action 1002, the performance comparing system 1 derives—e.g., with support from the perception data deriving unit 102—perception data 4 from a perception system 22 of the ADAS or ADS 21, adapted to estimate surroundings of the vehicle 2.

Action 1003

In Action 1003, the performance comparing system 1 receives—e.g., with support from the secondary perception data receiving unit 103—secondary perception data 5 from a secondary perception system 32 of a secondary ADAS or ADS 31 of the secondary vehicle 3.

Action 1004

In Action 1004, the performance comparing system 1 determines—e.g., with support from the discrepancy output determining unit 104—when the secondary vehicle 3 is locatable in the perception data 4, a discrepancy output based on comparison of at least a portion of the perception data 4 and at least a portion of the secondary perception data 5.

Optionally, Action 1004 of determining a discrepancy output may comprise determining at least a first portion of the discrepancy output based on comparison of perception data 4 comprising object state estimates 41 of the vehicle 2 and secondary perception data 5 comprising secondary object states estimates 51 of the vehicle 2.

Additionally or alternatively, optionally, Action 1004 of determining a discrepancy output may comprise determining at least a first portion of the discrepancy output based on comparison of perception data 4 comprising object state estimates 42 of the secondary vehicle 3 and secondary perception data 5 comprising secondary object state estimates 52 of the secondary vehicle 3.

Further optionally, when localization estimates 41, 42 of the vehicle 2 and the secondary vehicle 3 in the perception data 4 respectively aligns with localization estimates 51, 52 of the vehicle 2 and the secondary vehicle 3 respectively in the secondary perception data 5, then said Action 1004 of determining a discrepancy output may comprise determining additionally at least a second portion of the discrepancy output. Said second portion of the discrepancy output may then be based on comparison of perception data 4 comprising object state estimates 43 of at least a first surrounding object and secondary perception data 5 comprising secondary object states estimates 53 of the at least first surrounding object. Additionally or alternatively, said second portion of the discrepancy output may then be based on comparison of perception data 4 comprising free space estimates 44 of at least a region 45 around the vehicle 2 and secondary perception data 5 comprising secondary free space estimates 54 of at least a secondary region 55 around the secondary vehicle 3, wherein the region 45 at least partly overlaps 4555 the secondary region 55. Furthermore, additionally or alternatively, said second portion of the discrepancy output may then be based on comparison of perception data 4 comprising drivable area estimates 46 in at least a region 47 around the vehicle 2 and secondary perception data 5 comprising secondary drivable area estimates 56 in at least a secondary region 57 around the secondary vehicle 3, wherein the region 47 at least partly overlaps 4757 the secondary region 57.

Action 1005

In Action 1005, the performance comparing system 1 communicates—e.g., with support from the acknowledgement communicating unit 105—acknowledgement data 6, when at least a portion of the discrepancy output fulfils discrepancy exceedance criteria and/or when the vehicle 2 is perceivable in the secondary perception data 5 but the secondary vehicle 3 not is locatable in the perception data 4.

Optionally, Action 1005 of communicating acknowledgement data 6 may comprise transmitting the acknowledgement data 6 wirelessly to a remote entity 9, wherein the acknowledgement data 6 e.g., comprises the discrepancy output.

Additionally or alternatively, optionally, Action 1005 of communicating acknowledgement data 6 may comprise transmitting said acknowledgement data 6 to an on-board ADAS/ADS control system 24 adapted to control the ADAS or ADS 21, which acknowledgement data 6 comprises an indication to at least partly disable the ADAS or ADS 21.

Action 1006

In optional Action 1006, the performance comparing system 1 may communicate—e.g., with support from the acknowledgement communicating unit 105—when the discrepancy output fulfils further discrepancy exceedance criteria, further acknowledgement data 60, wherein the discrepancy exceedance criteria deviate from the further discrepancy exceedance criteria.

Optionally, Action 1006 of communicating further acknowledgement data 60 may comprise transmitting the further acknowledgement data 60 wirelessly to the remote entity 9, which further acknowledgement data 60 e.g., comprises the discrepancy output.

Additionally or alternatively, optionally, Action 1006 of communicating further acknowledgement data 60 may comprise transmitting the further acknowledgement data 60 to the ADAS/ADS control system 24, wherein the further acknowledgement data 60 comprises an indication to at least partly disable the ADAS or ADS.

The person skilled in the art realizes that the present disclosure by no means is limited to the preferred embodiments described above. On the contrary, many modifications and variations are possible within the scope of the appended claims. It should furthermore be noted that the drawings not necessarily are to scale and the dimensions of certain features may have been exaggerated for the sake of clarity. Emphasis is instead placed upon illustrating the principle of the embodiments herein. Additionally, in the claims, the word "comprising" does not exclude other elements or steps, and the indefinite article "a" or "an" does not exclude a plurality.

The invention claimed is:

1. A method performed by a perception comparing system of a vehicle for perception performance evaluation of one of an advanced driver-assistance system, ADAS, and an automated driving system, ADS, of the vehicle, the method comprising:
establishing communication with a secondary vehicle at least one of determined and estimated to be positioned within a potential range of surrounding detecting sensors on-board the vehicle;
deriving perception data from a perception system of the one of the ADAS and the ADS, adapted to estimate surroundings of the vehicle;
receiving secondary perception data from a secondary perception system of one of a secondary ADAS and ADS of the secondary vehicle;
determining, when the secondary vehicle is locatable in the perception data, a discrepancy output based on comparison of at least a portion of the perception data and at least a portion of the secondary perception data;
the determining including determining, based on localization estimates of the vehicle and the secondary vehicle in the perception data respectively aligning with localization estimates of the vehicle and the secondary vehicle respectively in the secondary perception data, at least a second portion of the discrepancy output based on at least one of:
comparison of perception data including free space estimates of at least a region around the vehicle and secondary perception data including secondary free space estimates of at least a secondary region around the secondary vehicle, the region at least partly overlapping the secondary region; and
comparison of perception data including drivable area estimates in at least a region around the vehicle and secondary perception data including secondary drivable area estimates in at least a secondary region around the secondary vehicle, the region at least partly overlapping the secondary region;
communicating acknowledgement data at least one of:
when at least a portion of the discrepancy output fulfils discrepancy exceedance criteria; and
when the vehicle is perceivable in the secondary perception data but the secondary vehicle is not locatable in the perception data; and
the communicating acknowledgement data comprising transmitting the acknowledgement data to an on-board ADAS/ADS control system, the ADAS/ADS control system being configured to control the one of the ADAS and the ADS, to cause the ADAS/ADS control system to at least partly disable the one of the ADAS and the ADS.

2. The method according to claim 1, wherein the determining comprises determining at least a first portion of the discrepancy output based on at least one of:
comparison of perception data comprising object state estimates of the vehicle and secondary perception data comprising secondary object state estimates of the vehicle; and
comparison of perception data comprising object state estimates of the secondary vehicle and secondary perception data comprising secondary object state estimates of the secondary vehicle.

3. The method according to claim 2, wherein:
the determining at least the second portion of the discrepancy output is based on a comparison of perception data comprising object state estimates of at least a first surrounding object and secondary perception data comprising secondary object state estimates of the at least first surrounding object.

4. The method according to claim 3, wherein the communicating acknowledgement data comprises:
transmitting the acknowledgement data wirelessly to a remote entity.

5. The method according to claim 3, further comprising:
communicating further acknowledgement data when the discrepancy output fulfils further discrepancy exceedance criteria, the discrepancy exceedance criteria deviating from the further discrepancy exceedance criteria.

6. The method according to claim 2, wherein the communicating acknowledgement data comprises:
transmitting the acknowledgement data wirelessly to a remote entity.

7. The method according to claim 6, further comprising:
communicating further acknowledgement data when the discrepancy output fulfils further discrepancy exceedance criteria, the discrepancy exceedance criteria deviating from the further discrepancy exceedance criteria.

8. The method according to claim 2, further comprising:
communicating further acknowledgement data when the discrepancy output fulfils further discrepancy exceedance criteria, the discrepancy exceedance criteria deviating from the further discrepancy exceedance criteria.

9. The method according to claim 1, wherein the communicating acknowledgement data comprises:
transmitting the acknowledgement data wirelessly to a remote entity.

10. The method according to claim 1, further comprising:
communicating further acknowledgement data when the discrepancy output fulfils further discrepancy exceedance criteria, the discrepancy exceedance criteria deviating from the further discrepancy exceedance criteria.

11. The method according to claim 10, wherein the communicating further acknowledgement data comprises one of:
transmitting the further acknowledgement data wirelessly to the remote entity; and
transmitting the further acknowledgement data to the ADAS/ADS control system, the further acknowledgement data comprising an indication to at least partly disable the one of the ADAS and the ADS.

12. A perception comparing system of a vehicle for perception performance evaluation of one of an advanced driver-assistance system, ADAS, and an automated driving system, ADS, of the vehicle, the system comprising:
at least one processor configured to:
establish communication with a secondary vehicle at least one of determined and estimated to be positioned within a potential range of surrounding detecting sensors on-board the vehicle;
derive perception data from a perception system of the one of the ADAS and the ADS, adapted to estimate surroundings of the vehicle;
receive secondary perception data from a secondary perception system of one of a secondary ADAS and ADS of the secondary vehicle;
determine, when the secondary vehicle is locatable in the perception data, a discrepancy output based on comparison of at least a portion of the perception data and at least a portion of the secondary perception data;

the determination including determining, based on localization estimates of the vehicle and the secondary vehicle in the perception data respectively aligning with localization estimates of the vehicle and the secondary vehicle respectively in the secondary perception data, at least a second portion of the discrepancy output based on at least one of:

comparison of perception data including free space estimates of at least a region around the vehicle and secondary perception data including secondary free space estimates of at least a secondary region around the secondary vehicle, the region at least partly overlapping the secondary region; and comparison of perception data including drivable area estimates in at least a region around the vehicle and secondary perception data including secondary drivable area estimates in at least a secondary region around the secondary vehicle, the region at least partly overlapping the secondary region;

communicate acknowledgement data at least one of:
when at least a portion of the discrepancy output fulfils discrepancy exceedance criteria; and
when the vehicle is perceivable in the secondary perception data but the secondary vehicle is not locatable in the perception data; and transmit the acknowledgement data to an on-board ADAS/ADS control system, the ADAS/ADS control system being adapted to control the one of the ADAS and the ADS, to cause the ADAS/ADS control system to at least partly disable the one of the ADAS and the ADS.

13. The perception comparing system according to claim 12, wherein the processor is configured to determine at least a first portion of the discrepancy output based on at least one of:

comparison of perception data comprising object state estimates of the vehicle and secondary perception data comprising secondary object state estimates of the vehicle; and comparison of perception data comprising object state estimates of the secondary vehicle and secondary perception data comprising secondary object state estimates of the secondary vehicle.

14. The perception comparing system according to claim 13, wherein:
the determining at least the second portion of the discrepancy output is based on a comparison of perception data comprising object state estimates of at least a first surrounding object and secondary perception data comprising secondary object state estimates of the at least first surrounding object.

15. The perception comparing system according to claim 13, wherein the processor is configured for:
transmitting the acknowledgement data wirelessly to a remote entity.

16. The perception comparing system according to claim 12, wherein the processor is configured for:
transmitting the acknowledgement data wirelessly to a remote entity.

17. The perception comparing system according to claim 12, wherein the processor is configured for:
communicating further acknowledgement data when the discrepancy output fulfils further discrepancy exceedance criteria, the discrepancy exceedance criteria deviating from the further discrepancy exceedance criteria.

18. The perception comparing system according to claim 17, wherein the processor is configured for one of:
transmitting the further acknowledgement data wirelessly to the remote entity.

19. The perception comparing system according to claim 12, wherein the perception comparing system and the one of the ADS and the ADAS are part of a vehicle.

20. A computer storage medium storing an executable computer program that, when executed, causes one of a computer and processor to perform a method for perception performance evaluation of one of an advanced driver-assistance system, ADAS, and an automated driving system, ADS, of a vehicle, the method comprising:

establishing communication with a secondary vehicle at least one of determined and estimated to be positioned within a potential range of surrounding detecting sensors on-board the vehicle;

deriving perception data from a perception system of the one of the ADAS and the ADS, adapted to estimate surroundings of said vehicle;

receiving secondary perception data from a secondary perception system of one of a secondary ADAS and ADS of the secondary vehicle;

determining, when the secondary vehicle is locatable in the perception data, a discrepancy output based on comparison of at least a portion of the perception data and at least a portion of the secondary perception data;

the determining including determining, based on localization estimates of the vehicle and the secondary vehicle in the perception data respectively aligning with localization estimates of the vehicle and the secondary vehicle respectively in the secondary perception data, at least a second portion of the discrepancy output based on at least one of:

comparison of perception data including free space estimates of at least a region around the vehicle and secondary perception data including secondary free space estimates of at least a secondary region around the secondary vehicle, the region at least partly overlapping the secondary region; and comparison of perception data including drivable area estimates in at least a region around the vehicle and secondary perception data including secondary drivable area estimates in at least a secondary region around the secondary vehicle, the region at least partly overlapping the secondary region;

communicating acknowledgement data at least one of:
when at least a portion of the discrepancy output fulfils discrepancy exceedance criteria; and
when the vehicle is perceivable in the secondary perception data but the secondary vehicle is not locatable in the perception data; and the communicating acknowledgement data comprising transmitting the acknowledgement data to an on-board ADAS/ADS control system, the ADAS/ADS control system being adapted to control the one of the ADAS and the ADS, to cause the ADAS/ADS control system to at least partly disable the one of the ADAS and the ADS.

* * * * *